United States Patent
Salim et al.

(10) Patent No.: US 7,063,138 B2
(45) Date of Patent: Jun. 20, 2006

(54) AUTOMOTIVE HVAC SYSTEM AND METHOD OF OPERATING SAME UTILIZING TRAPPED COOLANT

(75) Inventors: Munther M. Salim, Macomb, MI (US); Gregory A. Major, Farmington Hills, MI (US); Todd M. Tumas, Taylor, MI (US); Gaurav Anand, Sterling Hts., MI (US); Balaji Maniam, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 88 days.

(21) Appl. No.: 10/853,406

(22) Filed: May 25, 2004

(65) Prior Publication Data

US 2005/0263275 A1     Dec. 1, 2005

(51) Int. Cl.
*F25B 29/00* (2006.01)
*B60H 1/00* (2006.01)
*B60H 3/00* (2006.01)
*B60H 1/32* (2006.01)

(52) U.S. Cl. .................. 165/202; 165/10; 165/236; 62/59; 62/244; 62/406

(58) Field of Classification Search ............... 165/10, 165/236, 202; 62/244, 406, 59
See application file for complete search history.

(56) References Cited

U.S. PATENT DOCUMENTS

| | | | | |
|---|---|---|---|---|
| 5,277,038 | A | * | 1/1994 | Carr .......................... 62/434 |
| 6,606,877 | B1 | * | 8/2003 | Tomita et al. ............... 62/244 |
| 6,820,436 | B1 | * | 11/2004 | Tomita et al. ............. 62/228.1 |
| 2003/0046944 | A1 | * | 3/2003 | Kitamura et al. ............ 62/227 |

FOREIGN PATENT DOCUMENTS

JP         2001171336 A   *   6/2001

* cited by examiner

*Primary Examiner*—John K. Ford
(74) *Attorney, Agent, or Firm*—Laura C. Hargitt

(57) ABSTRACT

The present invention concerns a method for cooling a passenger compartment in a hybrid vehicle that operates an engine intermittently during vehicle operation. The hybrid vehicle includes an HVAC system having an HVAC duct, a blower for directing a flow of air through the HVAC duct, an evaporator located within the HVAC duct, and a heater core. The heater core has a coolant inlet outlet and is located downstream of the evaporator in the HVAC duct. The method includes the steps of cooling a refrigerant; inducing a flow of the cooled refrigerant through the evaporator; blocking a flow of coolant through the coolant inlet and outlet to trap coolant in the heater core; activating the blower to move air through the evaporator and heater core; turning off the vehicle engine; measuring a duct outlet temperature; and starting the engine when the measured duct outlet temperature is above a predetermined temperature.

11 Claims, 3 Drawing Sheets

AUTOMOTIVE HVAC SYSTEM AND METHOD OF OPERATING SAME UTILIZING TRAPPED COOLANT

BACKGROUND OF THE INVENTION

The present invention relates generally to automotive HVAC systems and methods of operating such HVAC systems.

Automotive HVAC systems are well known and are utilized for heating and cooling the passenger compartments of vehicles. Hybrid vehicles, which utilize a battery and an intermittently operated internal combustion engine for vehicle propulsion, have difficulty keeping the passenger compartment cool when the engine is off. When the engine is off, the HVAC compressor, typically run by a clutch connected to the engine, is also off and the temperature in the passenger compartment can rise quickly. The hybrid vehicle is most efficient when the engine is not running and, therefore, any extended increment of time that the engine is off increases fuel savings and reduces emissions.

It is desirable, therefore, to provide an HVAC system that allows for extended engine off time in hybrid vehicles while keeping the passenger compartment of the vehicle cool and also for precooling in conventional vehicles.

SUMMARY OF THE INVENTION

The present invention concerns a method for cooling a passenger compartment in a hybrid vehicle that operates an engine intermittently during vehicle operation. The hybrid vehicle includes an HVAC system having an HVAC duct, a blower adapted to direct a flow of air through the HVAC duct, an evaporator located within the HVAC duct, and a heater core. The heater core has a coolant inlet and a coolant outlet and is located downstream of the evaporator in the HVAC duct. The method includes the steps of cooling a refrigerant; inducing a flow of the cooled refrigerant through the evaporator; blocking a flow of coolant through at least one of the coolant inlet and the coolant outlet to thereby trap a predetermined amount of coolant in the heater core; activating the blower to move air through the evaporator and heater core; turning off the vehicle engine; measuring a duct outlet temperature; and starting the engine when the measured duct outlet temperature is above a predetermined temperature.

The HVAC system in accordance with the present invention preferably includes a bypass line extending between the engine coolant inlet and the engine coolant outlet. A first valve is disposed in a one of the engine coolant outlet and the engine coolant inlet for selectively blocking flow therethrough. A second valve is disposed in another of the engine coolant inlet and the engine coolant outlet and in the bypass line for selectively diverting flow through one of the bypass line and the another of the engine coolant inlet and the engine coolant outlet. A damper is disposed in the air duct and is operable to selectively expose and block the heater core to an air flow. The HVAC system also includes a duct temperature measurement device and a controller operatively engaging the compressor, the blower, the duct temperature measurement device, the damper, the first valve, and the second valve.

An advantage of the present invention is that the cooled coolant in the heater core is utilized when the engine is not running in hybrid vehicles to continue to provide cool air to the passenger compartment, which results in extended engine-off periods, leading to additional fuel savings and emissions reduction.

The method and HVAC system may also be utilized with conventional internal combustion engine vehicles whereby the flow of coolant through the heater core may be blocked and the coolant cooled, with the trapped coolant in the heater core available to provide precooling for the HVAC system at a later time. Alternatively, the trapped coolant can be used for mild tempering or mixing to avoid excessive cooling and then reheating of the air in the HVAC duct. In the cooling mode, preventing hot coolant flowing through the heater core also advantageously reduces the temperature in the HVAC duct as a result of preventing the higher temperature heater core from warming up air flowing near it.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1A:
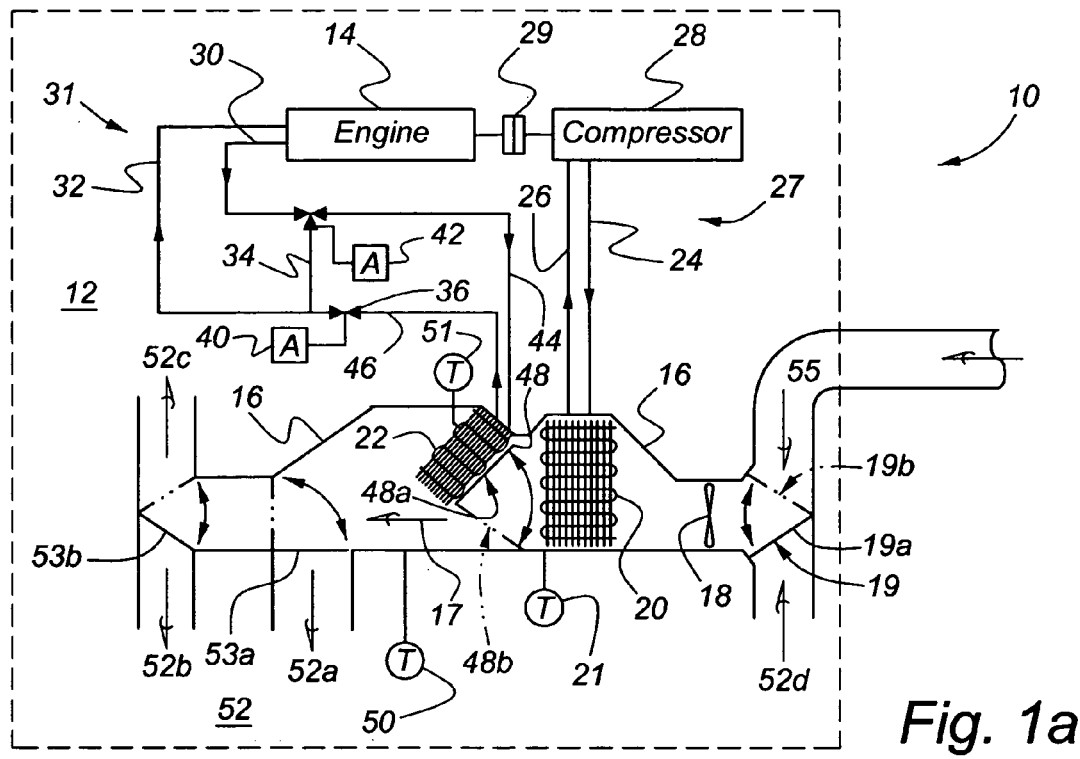
FIG. 1a is a schematic view of a HVAC system in accordance with the present invention.
Figure 1B:
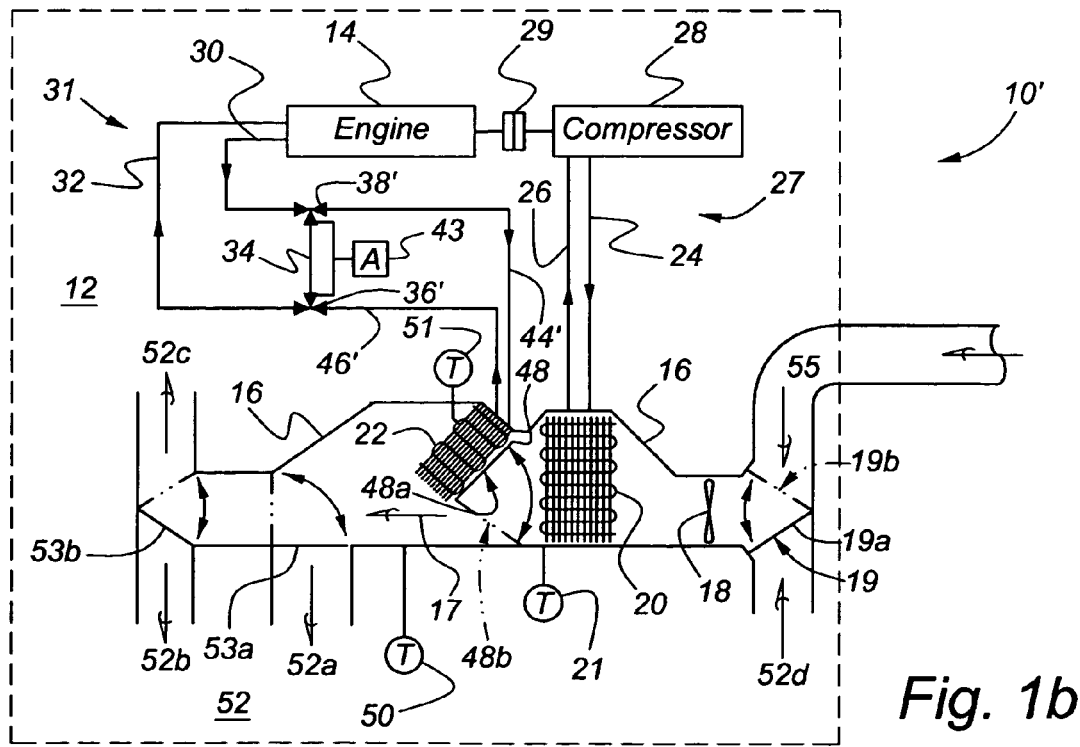
FIG. 1b is a schematic view of an alternative embodiment of a HVAC system in accordance with the present invention

Referring now to FIGS. 1a and 1b, a HVAC system in accordance with the present invention is indicated generally at 10 in FIG. 1a and at 10' in FIG. 1b. The HVAC system 10 and 10' is disposed in a vehicle, indicated generally at 12. The vehicle 12 may be a hybrid vehicle having an internal combustion engine 14 operating in conjunction with a battery (not shown) or a conventional vehicle having the internal combustion engine 14 only. The HVAC system includes a HVAC air duct 16 and a blower 18 adapted to direct a flow of air in a direction indicated by an arrow 17 through the HVAC duct 16. Preferably, the blower 18 is powered by an electric motor or the like. An evaporator 20 is located within the HVAC duct 16 downstream of the blower 18. A heater core 22 is located within the HVAC duct 16 downstream of the evaporator 20. The evaporator 20 includes a refrigerant inlet 24 from and a refrigerant outlet 26 to a refrigerant circuit, indicated generally at 27, including a refrigerant compressor 28. Preferably, the compressor 28 is driven by the engine 14 through a clutch 29. The compressor 28 may be a fixed displacement compressor or a variable displacement compressor, as will be appreciated by those skilled in the art. Alternatively, the compressor 28 is a variable displacement compressor that is driven by the engine but does not include a clutch, or is an electric-driven compressor. The refrigeration circuit 27, of course, may also include a condenser (not shown), a receiver/dryer (not shown), and a thermostatic expansion valve or orifice tube (not shown) in fluid communication with the compressor 28 and the evaporator 22. A refrigerant (not shown) is contained in the refrigerant circuit 27 and so flows through the refrigerant inlet 24, the refrigerant outlet 26, the compressor 28, and the evaporator 22. The refrigerant is selectively circulated through the piping during cooling operation of the HVAC system 10 and 10, discussed in more detail below. The heater core 22 has a coolant inlet 30 from and a coolant outlet 32 to an engine cooling circuit, indicated generally at 31, of the internal combustion engine 14. A coolant (not shown), such as a glycol/water mixture or the like, is contained in the engine cooling circuit 31 and thus flows through the coolant inlet 30, the coolant outlet 32, the engine 14, and the heater core 22. The coolant selectively circulates through the engine cooling circuit 31 during operation of the HVAC system 10 and 10', discussed in more detail below.

Referring now to FIG. 1a, a bypass line 34 extends between the engine coolant inlet 30 and the engine coolant outlet 32. A first valve 36 is disposed in the engine coolant outlet 32. A second valve 38 is disposed in the engine coolant inlet 30 and the bypass line 34. The first valve 36 is connected to an actuator 40, which is operable to open and close the first valve 36 for blocking flow through the engine coolant outlet 32. The second valve 38 is a three-way valve connected to an actuator 42, which is operable to open and close the second valve 38 for diverting flow to either of a portion 44 of the engine coolant inlet line 30 leading to the heater core 22 or the bypass line 34, discussed in more detail below. When the valves 36 and 38 are in a first or open position, the flow of coolant is from the engine 14, through the engine coolant inlet 30 and the valve 38, into the heater core 22 via the portion 44, out of the heater core 22 through a portion 46 of the engine coolant outlet line 32, through the valve 36 and the engine coolant outlet 32 and back to the engine 14. When the valves 36 and 38 are in a second or closed position, the flow of coolant is from the engine 14, through the engine coolant inlet line 30, through the valve 38, through the bypass line 34 and back to the engine 14 through the engine coolant outlet line 32. When the valves 36 and 38 are in the second or closed position, coolant is trapped in the heater core 22 and the portion 44 of the engine coolant inlet line 30 and the portion 46 of the engine coolant outlet line 32.

Referring now to FIG. 1b, the bypass line 34 extends between the engine coolant inlet 30 and the engine coolant outlet 32. A first valve 36' is disposed in the engine coolant outlet 32 and the bypass line 34. A second valve 38' is disposed in the engine coolant inlet 30 and the bypass line 34. The first valve 36' and the second valve 38' are connected to an actuator 43, which is operable to open and close both the first valve 36' and the second valve 38' for diverting flow to either of a portion 44' of the engine coolant inlet line 30 and a portion 46' of the engine coolant outlet line 32 or to the bypass line 34, discussed in more detail below. When the valves 36' and 38' are in a first or open position, the flow of coolant is from the engine 14, through the engine coolant inlet 30 and the valve 38', into the heater core 22 via the portion 44', out of the heater core 22 through the portion 46' of the engine coolant outlet line 32', through the valve 36' and the engine coolant outlet 32 and back to the engine 14. When the valves 36' and 38' are in a second or closed position, the flow of coolant is from the engine 14, through the engine coolant inlet line 30, through the valve 38', through the bypass line 34, through the valve 36' and back to the engine 14 through the engine coolant outlet line 32. When the valves 36' and 38' are in the second or closed position, coolant is trapped in the heater core 22 and the portion 44' of the engine coolant inlet line 30 and the portion 46' of the engine coolant outlet line 32.

Referring again to FIGS. 1a and 1b, a damper 48 is disposed in the HVAC duct 16 downstream of the evaporator 20 and adjacent the heater core 22. The damper 48 includes an actuator (not shown) such as an electric motor or the like that is operable to selectively expose and block the heater core 22 to an air flow from the blower 18. When the damper 48 is in a first position 48a, the air flowing from the blower 18 in the direction 17 bypasses the heater core 22. When the damper 48 is in a second position 48b, the air flowing from the blower 18 in the direction 17 flows through the heater core 22. An evaporator outlet temperature measurement device 21, such as a temperature sensor or the like, is disposed in the HVAC duct 16 downstream of the evaporator 20. A duct temperature measurement device 50, such as a temperature sensor or the like, is disposed in the HVAC duct 16 downstream of the heater core 22. A heater core temperature measurement device 51 is attached to the surface of the heater core 22. The HVAC duct 16 extends to a passenger compartment, indicated schematically at 52. A first damper 53a is disposed in the HVAC duct 16 for distributing air to a floor outlet 52a in the passenger compartment 52. A second damper 53b is disposed in the HVAC duct 16 for distributing air to either or both of a torso outlet 52b or a windshield outlet 52c in the passenger compartment 52. A recirculation damper 19 is disposed between an outside or fresh air inlet 55 and a return inlet 52d from the passenger compartment 52 to supply air to the blower 18. The recirculation damper 19 can move between a first position 19a and a second position 19b. The recirculation damper 19 is operable to selectively provide only fresh air from the fresh air inlet 55 (when in the first position 19a), only recirculated air from the recirculation air inlet 52d (when in the second position 19b), or a mixture of fresh air and recirculated air to the blower 18. Each of the dampers 53a, 53b and the recirculation damper 19 preferably includes an actuator (not shown) such as an electric motor or the like for moving the particular damper 53a, 53b, or 19 between respective closed and open positions.

Figure 2:
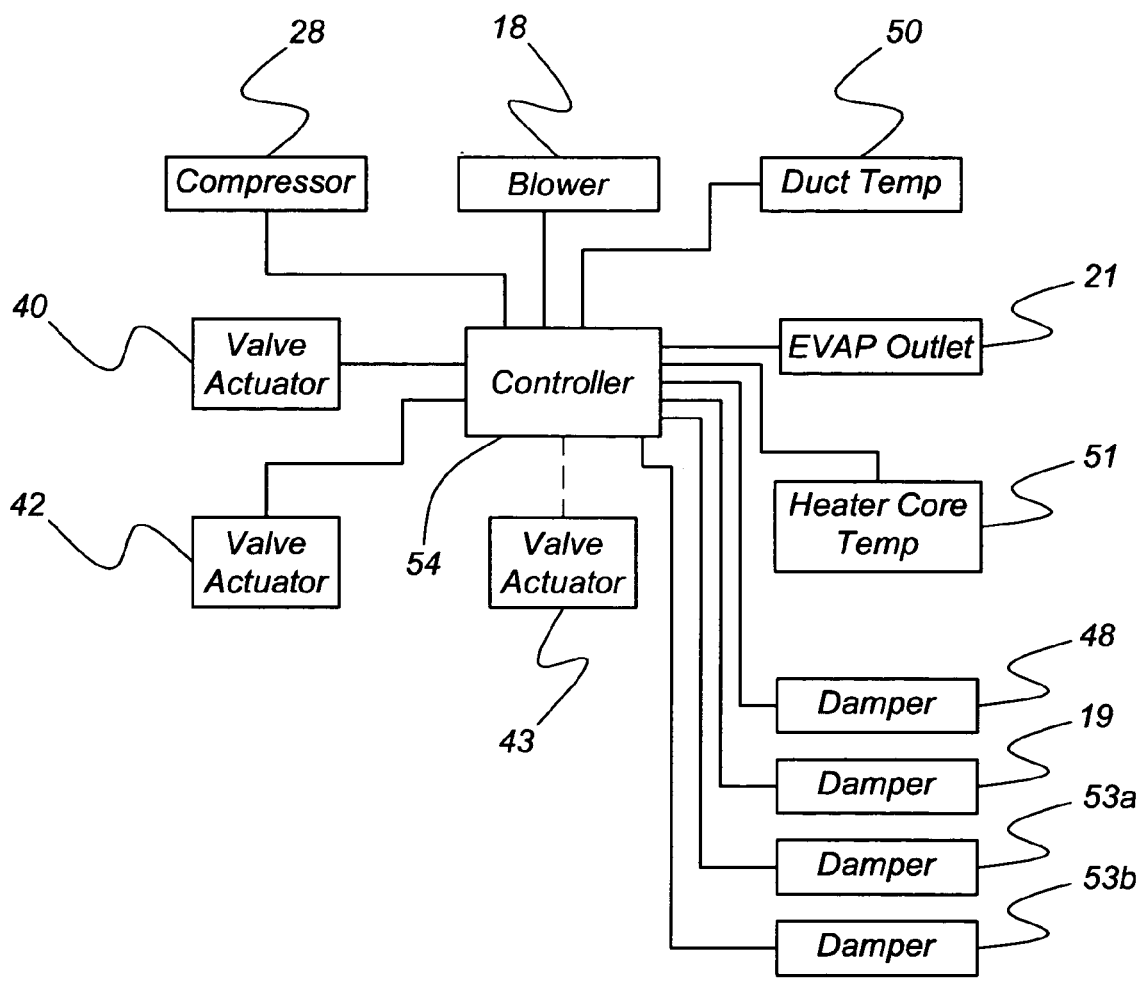
FIG. 2 is a block diagram of a HVAC system in accordance with the present invention.

Referring now to FIG. 2, the HVAC system 10 or 10' includes a controller 54 electrically connected to and operatively engaging the compressor 28, such as through the clutch 29 shown in FIG. 1, the blower 18, the duct temperature measurement device 50, and the actuator(s) 40, 42, or 43 of the respective first valve 36 or 36', and the second valve 38 or 38'. The controller 54 is electrically connected to and operatively engages the respective actuators of the dampers 19, 48, 53a, and 53b. The controller 54 is preferably an electronic control unit, such as an HVAC control unit or the like. The controller 54 may be a single microprocessor or a plurality of interconnected microprocessors. Furthermore, the controller 54 may be hardware, software, or any combination thereof as will be appreciated by those skilled in the art. The controller 54 is operable to receive signals, such as from the measurement devices 21, 50, and 51 and to transmit commands, such as to the compressor 28, the blower 18, the actuator(s) 40, 42, or 43, and the actuators of the dampers 19, 48, 53a, and 53b during operation of the HVAC system 10 or 10'.

In operation, the HVAC system 10 or 10' is activated and the controller 54 sends a signal for the clutch 29 to engage and operate the compressor 28. When the compressor 28 operates, the refrigerant in the piping of the HVAC system is compressed in the compressor 28 and flows through the refrigeration circuit 27 to the refrigerant inlet 24, through the evaporator 20, to the refrigerant outlet 26 and back through the rest of the refrigeration circuit 27 to the compressor 28. The controller 54 activates the blower 18 to move air through the HVAC duct 16 and through the evaporator 20. The refrigerant in the evaporator 20 absorbs heat from air in the HVAC duct 16 flowing in the direction 17, cooling the air for distribution to the vehicle interior 52. During startup of the HVAC system 10 or 10', the valves 36 and 38 or the valves 36' and 38' are preferably in the first or open position and the damper 48 is in the first position 48a.

At a predetermined time, such as after the passenger compartment 52 has reached a desired temperature, the controller 54 sends a signal to the actuators 40 and 42 to move the valves 36 and 38 or the controller 54 sends a signal to the actuator 43 to move the valves 36' and 38' from the first or open position to the second or closed position, blocking a flow of coolant through the coolant inlet 30 and the coolant outlet 32 and trapping a predetermined amount of coolant in the heater core 22 and the portions 44 and 46 or the portions 44' and 46' of the coolant inlet 30 and the coolant outlet 32. Alternatively, flow is blocked in at least one of the coolant inlet 30 and the coolant outlet 32 (not shown) in order to trap a predetermined amount of coolant in the heater core 22. The controller 54 sends a signal to the actuator of the damper 48 to move the damper 48 from at or near the first position 48a to at or near the second position 48b to direct cooled air downstream of the evaporator 20 through the heater core 22, whereby the trapped coolant in the heater core 22 transfers heat to the air flowing in the HVAC duct 16. The damper 48 remains in the second position 48b until the surface of the heater core 22 (as measured by the heater core temperature measurement device 51) drops to a predetermined temperature, after which the damper 48 may be moved to any position between the first position 48a and the second position 48b. Preferably, after the surface of the heater core 22 drops to the predetermined temperature, the damper 48 is moved to a position closer to the first position 48a in order to allow the air cooled by the evaporator 20 to flow to and cool the passenger compartment 52.

If the vehicle 12 is a hybrid vehicle, the engine 14 is selectively turned off under certain vehicle operating conditions. While the engine 14 is turned off, it can no longer drive the compressor 28. Thus, the flow of refrigerant through the refrigerant inlet 24, the refrigerant outlet 26, the compressor 28, the evaporator 20, and the rest of the refrigeration circuit 27 is stopped. In addition, after the engine 14 is turned off, the controller 54 sends a signal to the actuator of the damper 48 to move from the second position 48b to the first position 48a and a signal to the actuator of the damper 19 to move from the first position 19a to the second position 19b. The blower 18, however, continues to move air through the evaporator 20 and the HVAC duct 16, and the air flowing through the evaporator 20 continues to transfer heat to the refrigerant in the evaporator 20. The temperature of the air flowing through the HVAC duct 16 is monitored by the duct temperature measurement device 50. If the temperature in the HVAC duct 16 measured by the duct temperature measurement device 50 is below a predetermined amount, the damper 48 remains in the first position 48a and air does not flow through the heater core 22. If the temperature in the HVAC duct 16 measured by the duct temperature measurement device 50 is above or rises to a predetermined amount, the damper 48 is moved to the second position 48a, allowing air to flow through the heater core 22, with the air flowing through the heater core 22 now transferring heat to the trapped coolant in the heater core 22. The trapped coolant in the heater core 22, being previously cooled while the engine was running, acts as a thermal mass in addition to the refrigerant in the evaporator 20 and allows the air in the HVAC duct 16 to continue to be cooled with the engine 14 off. This extra cooling ability results in an extended engine-off period for the hybrid vehicle, which leads to additional fuel savings and emissions reduction. After the measured duct outlet temperature is above a predetermined temperature, the engine 14 is restarted, the compressor 28 is again engaged by the clutch 29 and the HVAC system 10 or 10' functions again as described above.

As an alternative operating strategy, after the engine 14 is turned off and the controller has sent a signal to the damper 48 to move from the second position 48b to the first position 48a and a signal to the actuator of the damper 19 to move from the first position 19a to the second position 19b, the evaporator outlet temperature is measured by the evaporator outlet temperature measurement device 21. If the temperature in the HVAC duct 16 at the evaporator outlet measured by the evaporator outlet temperature measurement device 21 is below a predetermined amount, the damper 48 remains in the first position 48a and air does not flow through the heater core 22. If the temperature in the HVAC duct 16 at the evaporator outlet measured by the evaporator outlet temperature measurement device 21 is above or rises to a predetermined amount, the damper 48 is moved to the second position 48a, allowing air to flow through the heater core 22, with the air flowing through the heater core 22 now transferring heat to the trapped coolant in the heater core 22. The trapped coolant in the heater core 22, being previously cooled while the engine was running, acts as a thermal mass in addition to the refrigerant in the evaporator 20 and allows the air in the HVAC duct 16 to continue to be cooled with the engine 14 off. This extra cooling ability results in an extended engine-off period for the hybrid vehicle, which leads to additional fuel savings and emissions reduction. After the measured duct outlet temperature is above a predetermined temperature, the engine 14 is restarted, the compressor 28 is again engaged by the clutch 29 and the HVAC system 10 or 10 functions again as described above. As another alternative operating strategy, the evaporator outlet temperature and the measured duct outlet temperature may be monitored separately by the controller 54, as discussed above, or in conjunction to provide more robust monitoring and control of the HVAC system 10 or 10'. Alternatively, a temperature is monitored or measured from any location in the HVAC system 10 or 10' where the measured temperature is indicative of a cooling function of the HVAC system 10 or 10'.

Alternatively, even if the vehicle 12 is not a hybrid vehicle, the flow of coolant through the heater core 22 may be blocked as outlined above and the trapped coolant in the heater core 22 can be cooled while the engine 14 is operating. Then, if one turns the engine 14 off for a short period of time, for example to run an errand, and then restarts the engine 14, the cooled coolant in the heater core 22 can be employed to provide pre-cooling to the passenger compartment 52 while the refrigeration circuit 27 is just beginning to operate, thus beginning the cooling process more quickly than with a conventional HVAC system. Alternatively, the trapped coolant can be used for mild tempering (mixing) to avoid excessive cooling and then reheating of the air in the HVAC duct 16. In the cooling mode, preventing hot coolant flowing through the heater core 22 also reduces the temperature in the HVAC duct 16 as a result of preventing the higher temperature heater core 22 from warming up air flowing near it.

Figure 3:
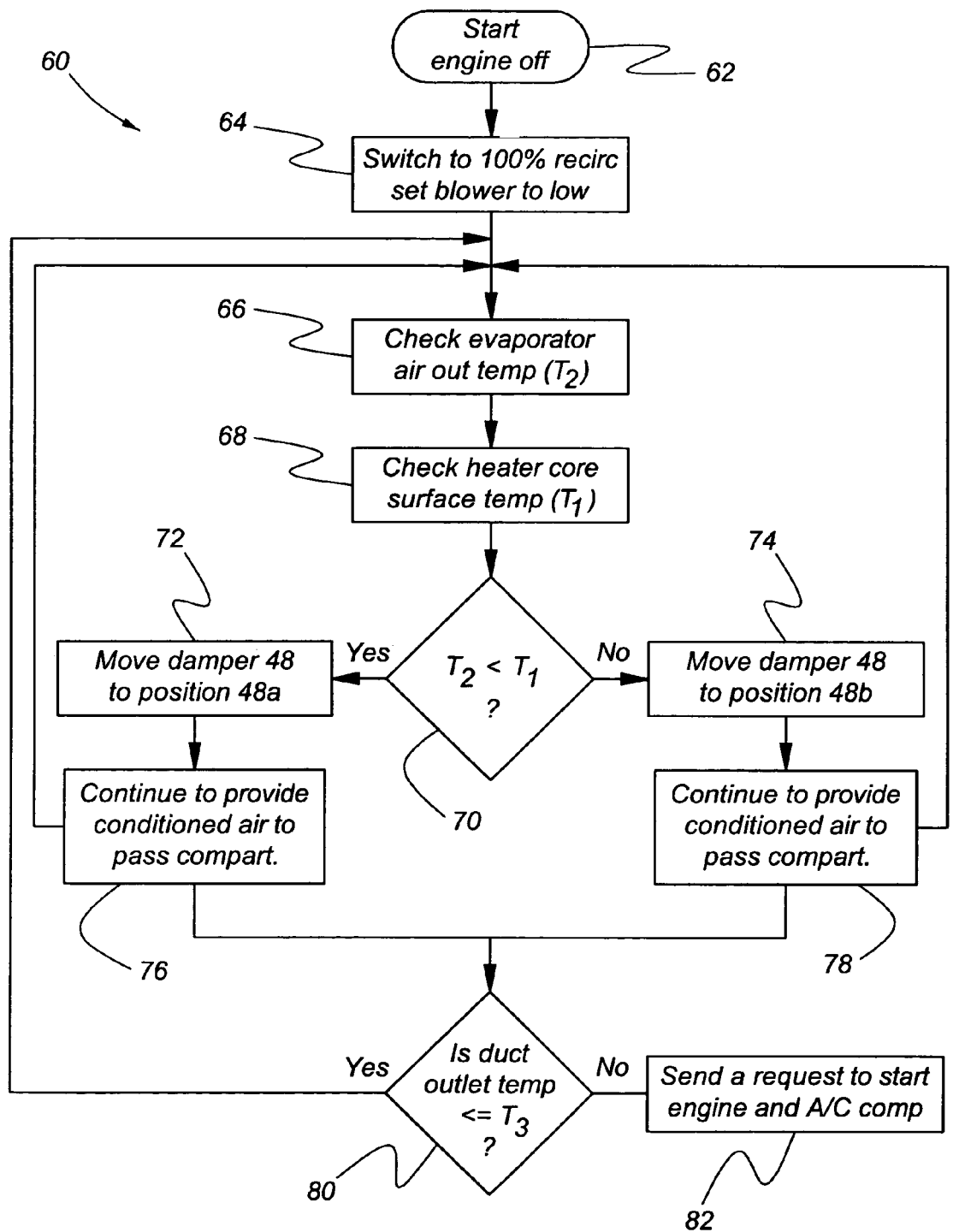
FIG. 3 is a flowchart of a method of operating the HVAC system of FIGS. 1a, 1b, and 2 in accordance with the present invention.

Referring now to FIG. 3, a flowchart of a method of operating the HVAC system 10 or 10' in accordance with the present invention is indicated generally at 60. In a step 62, the engine, such as the engine 14 in FIGS. 1a and 1b, is turned off. In a step 64, the HVAC system 10 or 10' is turned to a full recirculation mode, such as by moving the damper 19 of FIGS. 1*a* and 1*b* from the position 19*a* to the position 19*b* and a blower, such as the blower 18 in FIG. 1, is turned to a lower output to conserve battery power. In a step 66, the evaporator outlet temperature is measured, such as by the evaporator outlet temperature measurement device 21 of FIGS. 1*a* and 1*b*. In a step 68, the heater core surface temperature is measured, such as by the heater core temperature measurement device 51 of FIGS. 1*a* and 1*b*. In a step 70, the evaporator outlet temperature is compared to the heater core surface temperature. If the evaporator outlet temperature is greater than the heater core surface temperature, a damper adjacent a heater core, such as the heater core 22 and damper 48 of FIGS. 1*a* and 1*b* is moved to a position to allow flow through the heater core in a step 72. If the evaporator outlet temperature is less than the heater core surface temperature, the damper is moved to a position to prevent flow through the heater core in a step 74. In a step 76 and a step 78, the HVAC system continues the operation of the blower to provide cooled air to a passenger compartment, such as the passenger compartment 52 of FIGS. 1*a* and 1*b*. In a step 80, the duct outlet temperature is measured, such as by the duct temperature measurement device 50 of FIGS. 1*a* and 1*b*. If the duct outlet temperature is greater than a predetermined temperature, such as 15 degrees Celsius, a request is sent to restart the engine in a step 82. If the evaporator outlet temperature is less than the predetermined temperature, the method returns to the step 66 to measure the evaporator outlet temperature.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for cooling a passenger compartment in a hybrid vehicle that operates an engine intermittently during vehicle operation, the hybrid vehicle having an HVAC system including an HVAC duct, a blower adapted to direct a flow of air through the HVAC duct, an evaporator located within the HVAC duct, and a heater core, which has a coolant inlet and a coolant outlet and is located downstream of the evaporator in the HVAC duct, the method comprising the steps of:
   a) cooling a refrigerant;
   b) inducing a flow of said cooled refrigerant through said evaporator;
   c) blocking a flow of coolant through at least one of said coolant inlet and said coolant outlet to thereby trap a predetermined amount of coolant in said heater core;
   d) activating said blower to move air through said evaporator and heater core;
   e) turning off the vehicle engine;
   f) measuring a temperature indicative of a cooling function of said HVAC system;
   g) starting the engine when the measured temperature is above a predetermined temperature; and
   h) measuring an evaporator air outlet temperature;
   i) measuring a heater core surface temperature;
   j) blocking the flow of air through the heater core when the evaporator air outlet temperature is less than the heater core surface temperature and the vehicle engine is off; and
   k) continuing the flow of air through the heater core when the evaporator air outlet temperature is not less than the heater core surface temperature and the vehicle engine is off.

2. The method according to claim 1 wherein step c) is performed when a predetermined air temperature has been reached in said HVAC duct.

3. The method according to claim 1 wherein step d) is further defined by actuating a damper in said HVAC duct to direct a flow of air through said heater core.

4. The method according to claim 3 wherein, prior to actuating said damper, the method includes a step of actuating another damper in said HVAC duct to provide only recirculated air to said HVAC duct.

5. The method according to claim 1 wherein step c) is further defined by actuating a valve in each of said coolant inlet and said coolant outlet to thereby trap the coolant in the heater core.

6. The method according to claim 1 wherein a controller receives and sends signals to perform steps a) through g).

7. The method according to claim 1 wherein, after step e), the method includes a step of actuating a damper in said HVAC duct to provide only recirculated air to said HVAC duct.

8. A method for cooling a passenger compartment in a vehicle that operates an HVAC compressor intermittently during vehicle operation, the vehicle having an HVAC system including an HVAC duct, a blower adapted to direct a flow of air through the HVAC duct, an evaporator located within the HVAC duct, and a heater core, which has a coolant inlet and a coolant outlet and is located downstream of the evaporator in the HVAC duct, the method comprising the steps of:
   a) cooling a refrigerant;
   b) inducing a flow of said cooled refrigerant through said evaporator;
   c) blocking a flow of coolant through at least one of said coolant inlet and said coolant outlet to thereby trap a predetermined amount of coolant in said heater core;
   d) activating said blower to move air through said evaporator and heater core and actuating a damper in said HVAC duct to direct the air through said heater core;
   e) cycling said compressor off;
   f) measuring a duct outlet temperature;
   g) cycling said compressor an when the measured duct outlet temperature is above a predetermined; and
   h) prior to actuating said damper, actuating another damper in said HVAC duct to provide only recirculated air to said HVAC duct.

9. The method according to claim 8 further including the steps of:
   measuring an evaporator air outlet temperature;
   measuring a heater core surface temperature;
   blocking the flow of air through the heater core when the evaporator air outlet temperature is less than the heater core surface temperature a vehicle engine is off; and
   continuing the flow of air through the heater core when the evaporator air outlet temperature is not less than the heater core surface temperature and the vehicle engine is off.

10. The method according to claim 8 wherein step d) is further defined by actuating a damper in said HVAC duct to direct a flow of air through said heater core.

11. A method for cooling a passenger compartment in a vehicle that operates an HVAC compressor intermittently during vehicle operation, the vehicle having an HVAC system including an HVAC duct, a blower adapted to direct a flow of air through the HVAC duct, an evaporator located within the HVAC duct, and a heater core, which has a coolant inlet and a coolant outlet and is located downstream of the evaporator in the HVAC duct, the method comprising the steps of:
  cooling a refrigerant;
  inducing a flow of said cooled refrigerant through said evaporator;
  blocking a flow of coolant through at least one of said coolant inlet and said coolant outlet to thereby trap a predetermined amount of coolant in said heater core;
  activating said blower to move air through said evaporator and heater core;
  cycling said compressor off;
  measuring a duct outlet temperature;
  cycling said compressor on when the measured duct outlet temperature is above a predetermined temperature;
  measuring an evaporator air outlet temperature;
  measuring a heater core surface temperature;
  blocking the flow of air through the heater core when the evaporator air outlet temperature is less than the heater core surface temperature and the compressor is off; and
  continuing the flow of air through the heater core when the evaporator air outlet temperature is not less than the heater core surface temperature and the compressor is off.

* * * * *